United States Patent
Tsuge

[11] Patent Number: 5,996,763
[45] Date of Patent: Dec. 7, 1999

[54] GEAR SHIFT LOCK DEVICE FOR A VEHICULAR AUTOMATIC TRANSMISSION

[75] Inventor: Yoshikatsu Tsuge, Nagoya, Japan

[73] Assignee: Chuo Hatsujo Kabushiki Kaisha, Aichi-ken, Japan

[21] Appl. No.: 09/107,988

[22] Filed: Jul. 1, 1998

[30] Foreign Application Priority Data

Jul. 1, 1997 [JP] Japan ..................................... 9-176120

[51] Int. Cl.⁶ .................................................. B60K 41/26
[52] U.S. Cl. ..................................... 192/220.3; 74/473.21; 477/96
[58] Field of Search ............................. 192/220.3, 220.2; 74/473.21, 480 R; 477/96

[56] References Cited

U.S. PATENT DOCUMENTS

| | | | |
|---|---|---|---|
| 4,884,668 | 12/1989 | Kabayashi et al. | 477/96 |
| 4,887,702 | 12/1989 | Ratke et al. | 477/96 |
| 4,905,802 | 3/1990 | Gotoh | 74/483 R X |
| 5,014,831 | 5/1991 | Wawra et al. | 192/220.4 X |
| 5,018,610 | 5/1991 | Rolinski et al. | 477/96 |
| 5,035,156 | 7/1991 | Roble | 477/99 |
| 5,078,242 | 1/1992 | Ratke et al. | 477/96 |
| 5,129,494 | 7/1992 | Rolinski et al. | 477/96 |
| 5,695,429 | 12/1997 | Kataumi et al. | 477/96 |

FOREIGN PATENT DOCUMENTS

| | | |
|---|---|---|
| 63-59738 | 4/1988 | Japan . |
| 1-178026 | 7/1989 | Japan . |
| 7-44848 | 10/1995 | Japan . |

Primary Examiner—Rodney H. Bonck
Assistant Examiner—Saul Rodriguez
Attorney, Agent, or Firm—Sughrue, Mion, Zinn Macpeak & Seas, PLLC

[57] ABSTRACT

In a gear shift lock device for an automatic transmission, a lock cover (13) is provided to prevent the rotational movement of a select plate (10) while a shift lock is working. The lock cover (13) is provided to prevent the rotational movement of the select plate (10) by placing it between the select plate (10) and the slide plate (5a). With this structure, when the downward force of a detent pin (5) is transmitted to the select plate (10) at the time of pushing a button (3) of a shift knob, no prying force occurs on the lock cover (13) to prevent any malfunctions.

5 Claims, 9 Drawing Sheets

GEAR SHIFT LOCK DEVICE FOR A VEHICULAR AUTOMATIC TRANSMISSION

BACKGROUND OF THE INVENTION

1. Field of the Invention

The invention relates to a gear shift lock device for a vehicular automatic transmission in which a gear shift action is rendered inoperative while a parking brake pedal is not applied.

2. Description of Prior Art

In a gear shift lock device for a vehicular automatic transmission, a gear shift action is usually rendered inoperative when not applying a parking brake pedal as shown in FIG. 12. A detent pin J1 of a gear shift lever engages with a detent cam J3 which is provided on a detent plate J2 so as to provide a plurality of ranges including a parking range in combination with an operation of the gear shift lever.

The gear shift lock device has a select plate J4 having an engagement member J5, and is provided rotationally between a lock position in which the engagement member J5 lodges the detent pin J1 to lock, the gear shift lever in the parking range, and an unlock position in which the engagement member J5 is dislodged from the detent pin J1.

When the engagement member J5 is engaged with the detent pin J1, the select plate J4 is adapted to engage with a lock pin J7 which is connected to an end of a shift lock cable J6 so as to move in association with a parking brake pedal. When the parking brake pedal is applied, the lock pin J7 is dislodged from the select plate J4 to allow the plate J4 a rotational movement so as to operate the gear shift lever from the parking range to other ranges.

Since the detent pin J1 is adapted to move downward with pushing operation of a button which is attached to a knob of the gear shift lever, pushing the button makes the detent pin J1 move downward to impart the rotational movement to the select plate J4 as shown by an arrow (A) in FIG. 12 when the parking brake pedal is not applied (i.e., a gear shift lock is working).

The rotational movement of the select plate J4, exerts against the lock pin J7 to cause a prying force against a cylinder guide J8 which encloses the lock pin J7.

The prying force, thus generated, would be one of the causes to invite a mulfunction with the pushing operation of the button in the prior gear shift lock device.

Therefore, the present invention has made with the above drawbacks in mind, it is a main object of the invention to provide a gear shift lock device for a vehicular automatic transmission which is capable of preventing the prying force from occurring on a lock pin so as to maintain a good function even when a rotational force is transmitted to the select plate by pushing a button while a gear shift lock is working.

SUMMARY OF THE INVENTION

According to the present invention, there is provided a gear shift lock device for a vehicular automatic transmission comprising: a movable gear shift lever provided to select a specified one among a plurality of ranges including a parking range for a vehicular automatic transmission; a detent pin arranged to move downward by depressing a button provided on a knob of the gear shift lever; a detent plate provided in a movable range of the gear shift lever, and having a detent cam which designates one of the plurality of ranges including the parking range when brought into engagement with the detent pin; a select plate having an engagement portion, and provided rotationally between a lock position in which the engagement portion lodges the detent pin to lock the gear shift lever in the parking range, and an unlock position in which the engagement portion is dislodged from the detent pin; a key interlock cable having on one end connected to the select plate and the other end connected to a key cylinder to transmit the movement of the key cylinder to the select plate in order to place the select plate in the lock position when a key is in a position to stop an engine, and placing the select plate in the unlock position when the key is in a position to start the engine; a lock cover provided slidably on a stationary member between a first position in which the select plate is placed between the stationary member and the select plate to place the select plate in the lock position so as to prevent the rotational movement of the select plate, and a second position in which the select plate is released to recover its rotational movement; a step-in detection member provided on a parking brake pedal so as to move with the step motion of the parking brake pedal; and a shift lock cable having one end connected to the lock cover and the other end connected to the step-in detection member so as to transmit the movement of the parking brake pedal to the lock cover in order to set a slidable position of the lock cover in the first position when the parking brake pedal is not applied, and placing the slidable position of the lock cover in the second position when the parking brake pedal is applied.

According to another aspect of the invention, the lock cover has an upwardly directed lug and the select plate has a laterally directed lug so as to engage the upward lug against the lateral lug to prevent the rotational movement of the select plate when the lock cover is in the first position.

According to still another aspect of the invention, the upward lug engages against the lateral lug to set the slidable position of the lock cover in the second position irrespective of where the parking brake pedal occupies when the select plate is in the unlock position.

According to still another aspect of the invention, a length of an upper surface of the upward lug is greater than a stroke of the shift lock cable but shorter than lateral movement of the lateral lug.

With the parking brake pedal not applied when the gear shift lever is in the parking range, the lock cover is placed between the select plate and the stationary member so as to prevent the select plate from rotationally moving to the unlock position. That is, the select plate is locked in the lock position.

This renders unable to move the key in the starting position because the key is held in a locked position.

Because of the select plate held in the lock position, the pushing the button renders impossible to lower the detent pin to keep the gear shift lever in the parking range.

In this way, when the detent pin is exerted to move downward with the pushing operation of the button while the parking brake pedal is not applied (i.e., the gear shift lock is working), the lock cover is placed between the select plate and the stationary member so as to prevent the rotational movement of the select plate.

Namely, even when the rotational force is applied to the select plate while the gear shift lock is working, it is possible to avoid the prying force from occurring against the lock cover which prevents the rotational movement of the select plate.

DETAILED DESCRIPTION OF THE PREFERRED EMBODIMENTS OF THE INVENTION

Figure 1:
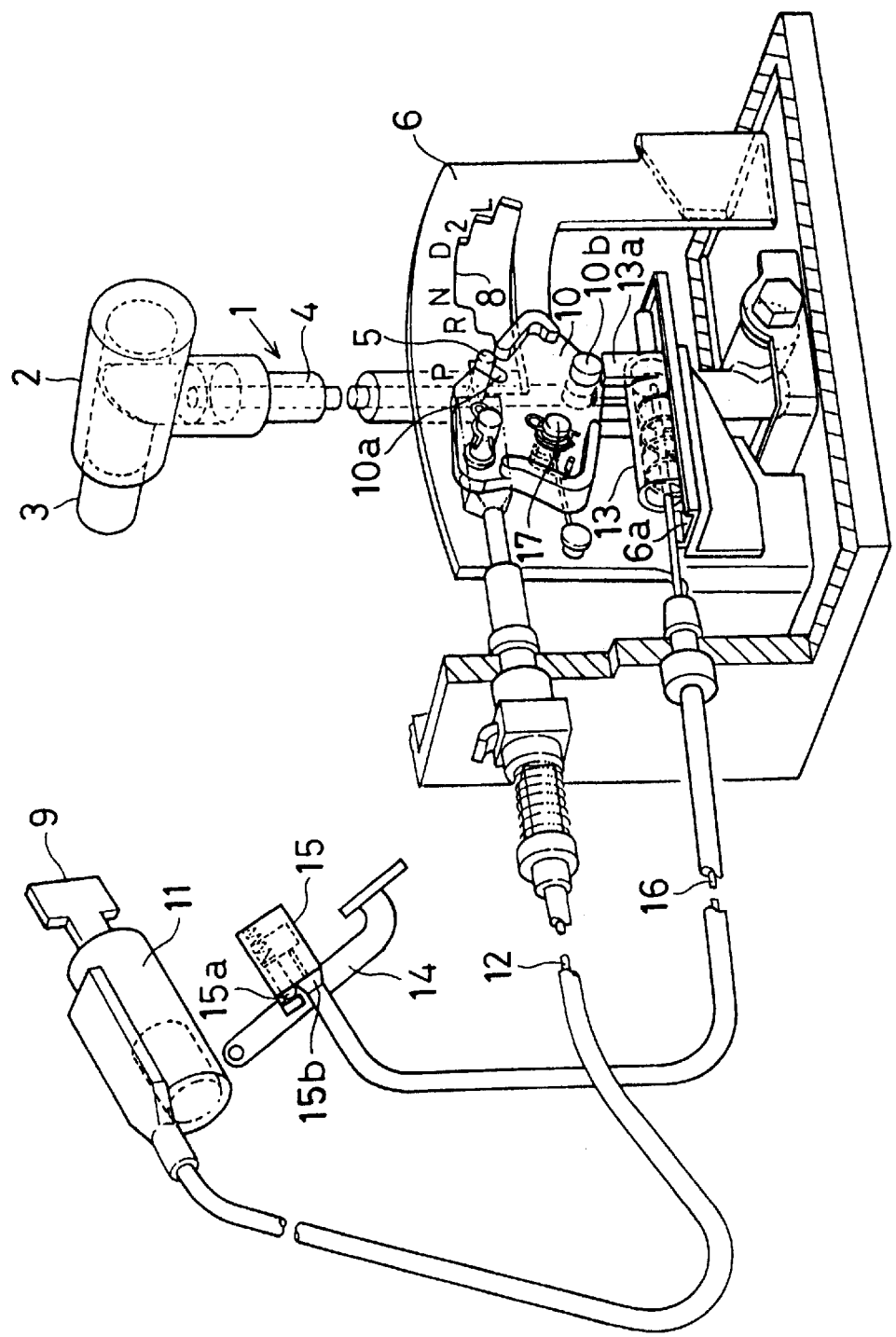
FIG. 1 is a perspective view of a gear shift lock device when a gear shift is locked according to an embodiment of the invention.
Figure 2:
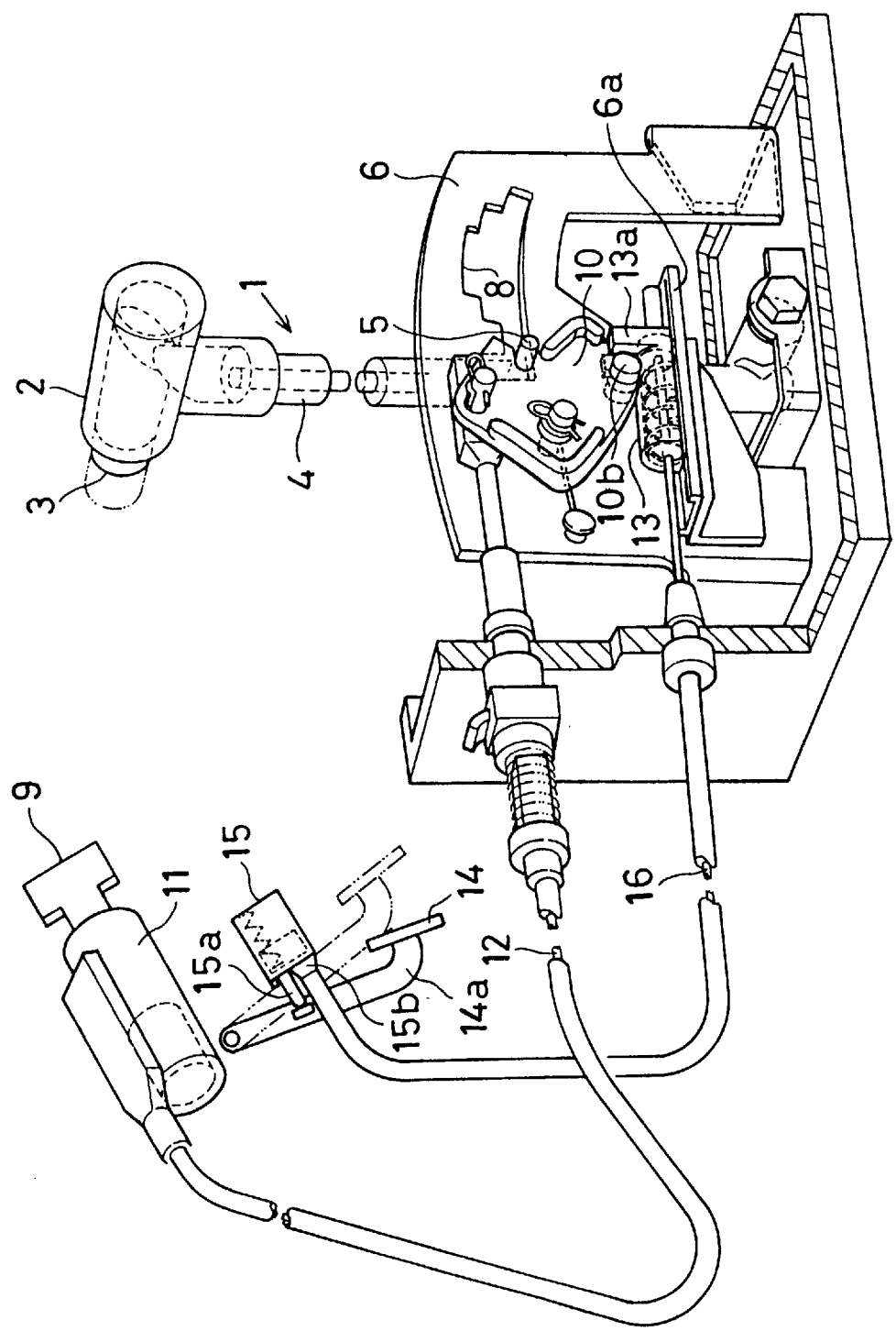
FIG. 2 is a perspective view of the gear shift lock device when the gear shift is unlocked.

Referring to FIG. 1 and 2 which show a gear shift lock device when a gear shift is locked and unlocked respectively, an automatic transmission has a gear shift lever 1 to manually select one position among a parking range (P range), reverse range (R range), neutral range (N range), drive range (D range), second range (2nd range) and low range (L range).

A knob 2 of the gear shift lever 1 has a button 3. A shaft 4 of the gear shift lever 1 has a detent pin 5 in such a manner as to extend laterally. The detent pin 5 moves downward when the button 3 is pushed. Within a range in which the gear shift lever 1 can move, there is provided a detent plate 6 attached to a vehicular chassis. The detent plate 6 has a detent cam 8 which is brought into engagement with the detent pin 5 so as to forms a plurality of ranges including the P range when the detent pin 5 moves upward by means of a spring (not shown).

In the gear shift lock device provided on the automatic transmission, the gear shift lever 1 is held in the parking range, and keeping a key 9 in a position to stop an engine.

In the gear shift lock device, select plate 10 is provided to regulate the detent pin 5, and a key interlock cable 12 is provided to transmit the movement of a key cylinder 11 to the select plate 10 when the key cylinder 11 is operated by the key 9. A lock cover 13 is provided to regulate the movement of the select plate 10. A step-in detection member 15 is provided to move in association with a parking brake pedal 14. A shift lock cable 16 is provided to transmit the movement of the parking brake pedal 14 to the lock cover 13.

Figure 3:
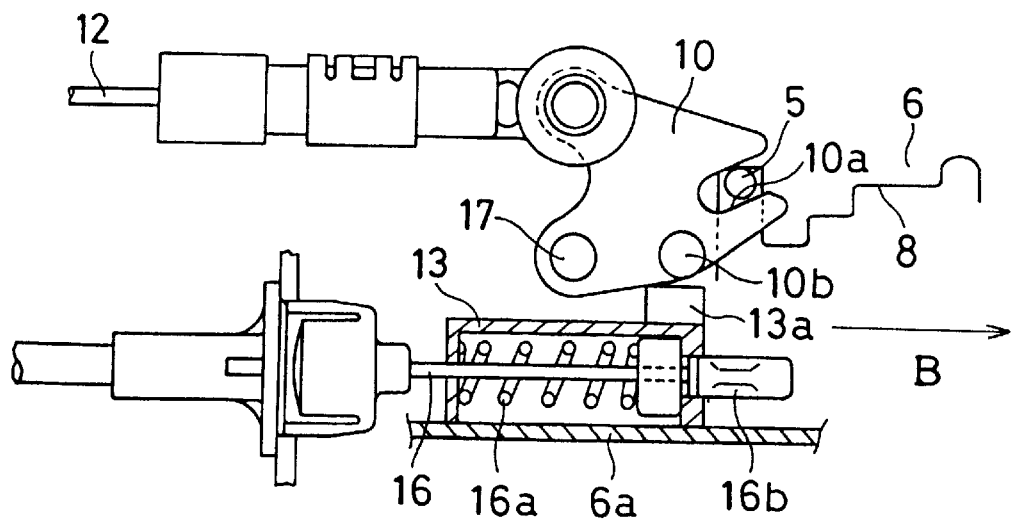
FIG. 3 is a side elevational view of a main part of the gear shift lock device.

As also shown in FIG. 3, the select plate 10 is arranged to rotationally move around a pin 17, and having a notched engagement member 10a to lodge the detent pin 5.

The select plate 10 is rotationally movable between a lock position in which the engagement member 10a lodges the detent pin 5 to move the shift lever 1 to the P range (FIGS. 1 and 3), and an unlock position in which the engagement member 10a moves downward to dislodge the detent pin 5 from the engagement member 10a (FIGS. 2).

The key interlock cable 12 has one end connected to the select plate 10 and the other end connected to the key cylinder 11 to transmit the movement of the key cylinder 11 to the select plate 10.

In more concrete terms, the key interlock cable 12 places the select plate 10 in the lock position when the key 9 is in the position to stop the engine, and placing the select plate 10 in the unlock position when the key 9 is in the position to start the engine.

The lock cover 13 is a casing rectangular in cross section, and slidably mounted on a slide plate 6a (stationary member) firmly attached to the detent plate 6. The lock cover 13 is placed between the select plate 10 and the slide plate 6a so as to occupy a block. position (first position) in which the select plate 10 is blocked by its movement in the lock position when the lock cover 13 slides rearward. When the lock cover 13 slides forward in the direction of arrow B in FIG. 3, the lock cover 13 places the select plate 10 in a block release position (second position) in which the select plate 10 is movable from lock position to in the unlock position.

Figure 4:
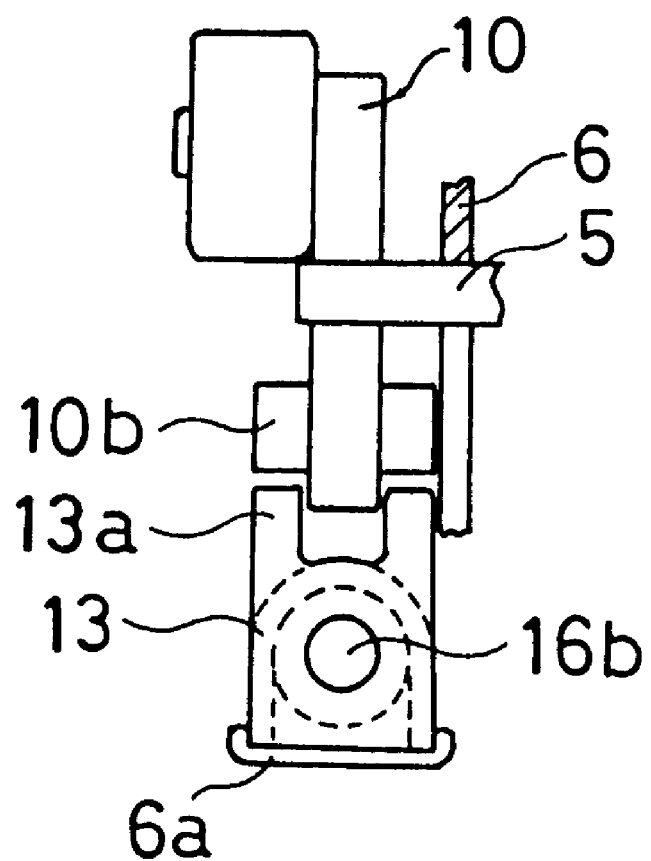
FIG. 4 is rear side elevational view of a main part of the gear shift lock device.

An upper surface of the lock cover 13 has an upwardly directed lug 13a and the select plate 10 has a laterally directed lug 10b as shown in FIGS. 3 and 4.

When occupying the block position, the upward lug 13a brings its upper surface into engagement with an underside of the lateral lug 10b to block the rotational movement of the select plate 10.

When occupying the block release position in which the lock cover 13 has slid forward, the upward lug 13a releases the select plate 10 so as to allow its rotational movement.

With the condition in which the select plate 10 is placed in the unlock position, a swing mechanism (not shown) works so that the upward lug 13a brings its elevational side into engagement with the lateral lug 10b to hold the lock cover 13 in the block release position irrespective of whether or not the parking brake pedal 14 is applied.

Within an inner space of the lock cover 13, a helical spring 16a is provided to move the lock cover 13 rearward. A wire end 16b extends from a rear side of the lock cover 13. Against the urging force of the spring 16a, the wire end 16b moves only in such situation as to block the forward movement of the lock cover 13 when the upward lug 13a engages with the lateral lug 10b at the time of applying the parking brake pedal 14.

In this instance, a length of the upper surface of the upward lug 13a along the slidable direction is greater than a stroke of the shift lock cable 16 but shorter than the lateral movement of the lateral lug 10b.

By way of example, the stroke of the shift lock cable 16 is 8.0 mm, and the lateral movement of the lateral lug 10b is 6.0 mm. The length of the upper surface of the upward lug 13a along the slidable direction is 7.0 mm.

The step-in detection member 15 has a movable element in combination with the parking brake pedal 14 so as to transmit the movement of the movable element to the lock cover 13 by way of a shift lock cable 16.

In the step-in detection member 15, there are provided a pin 15a and a feeder 15b each oriented in the same direction in which a motor vehicle moves forward. The pin 15a engages with a stem 14a of the parking brake pedal 14.

With the pin 15a and the feeder 15b oriented in the same direction, it is possible to make the bending angle approx. 180° formed from the parking brake pedal 14 to the shift lever 1. This makes the sliding resistance small so as to avoid malfunctions due to greater sliding resistance which the shift lock cable 16 exhibits at the time of routing the cable 16.

Figure 5:
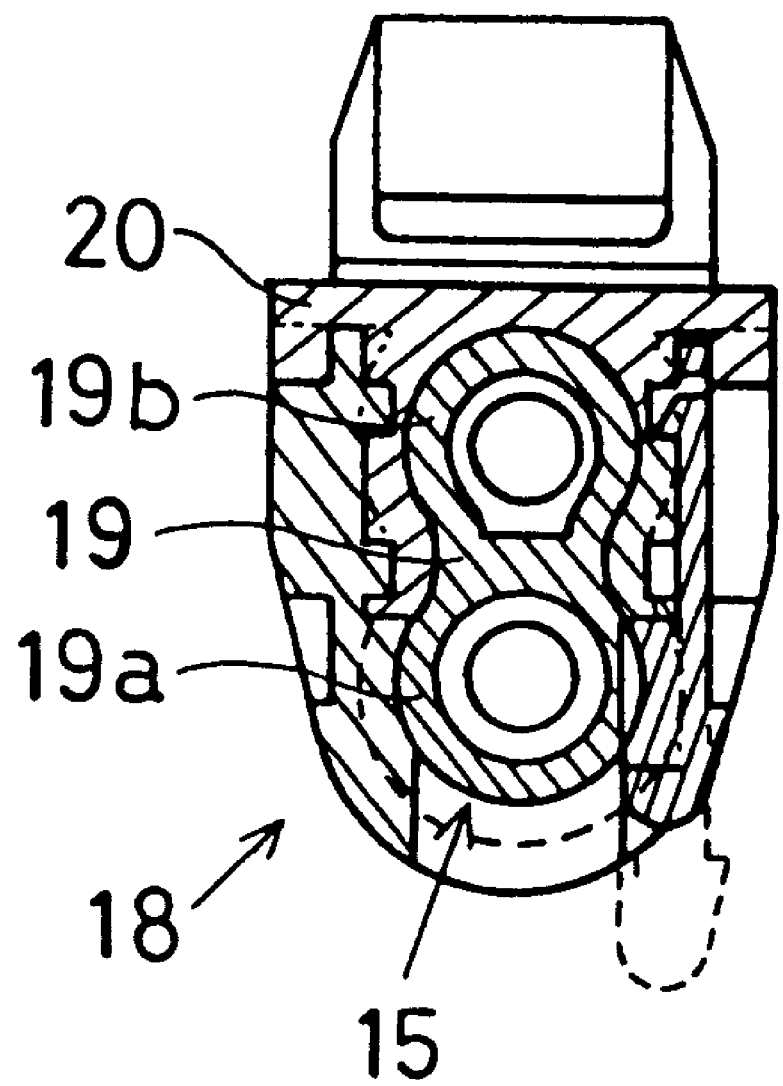
FIG. 5 is a cross sectional view of an adjuster device.
Figure 6:
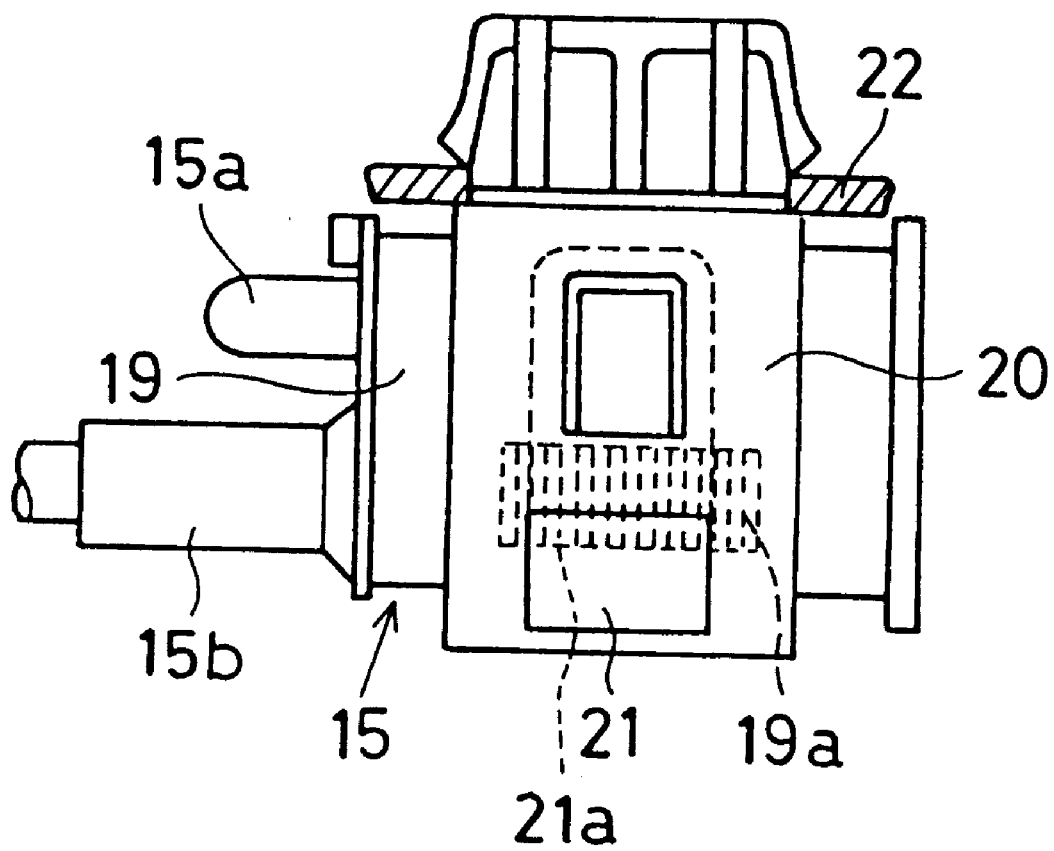
FIG. 6 is a side elevational view of the adjuster device.
Figure 7:
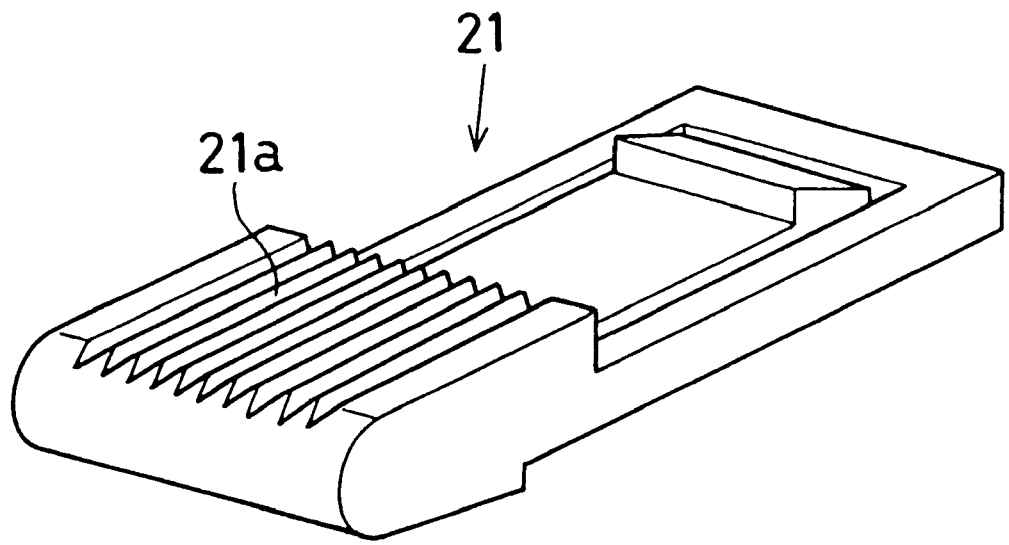
FIG. 7 is a perspective view of a key lock device.

It is necessary to position the step-in detection member 15 when the stem 14a of the parking brake pedal 14 begins to engage with the pin 15a. In order to position the step-in detection member 15, an adjuster device 18 is used to carry out the following procedures (FIGS. 5~7), As shown in FIG. 5, the step-in detection member 15 has a cocoon-shaped cap 19 having a larger half 19a and a smaller half 19b combined. A casing 20 is fixed on the vehicular chassis 22 in the proximity of the parking brake pedal 14 so as to firmly hold the cap 19 as shown in FIG. 6. The casing 20 allows the cap 19 to slide in its axial direction. After setting the step-in detection member 15 in position against the parking brake pedal 14, a locker key 21 (FIG. 7) is slid into the casing 20. This engages an indentation 21a formed on the locker key 21 with an indentation (not shown) formed on the larger half 19a of the cap 19 in order to complete placing the step-in detection member 15 in position.

The shift lock cable 16 has one end connected to the lock cover 13 and the other end connected to the step-in detection member 15 so as to transmit the movement of the parking brake pedal 14 to the lock cover 13.

Namely, the shift lock cable 16 sets the lock cover 13 in the forward block position when the parking brake pedal 14 is not applied at the time of stopping the engine. When the parking brake pedal 14 is applied, the shift lock cable 16 sets the lock cover 13 in the block release position in which the lock cover 13 has slid rearward.

Figure 8:
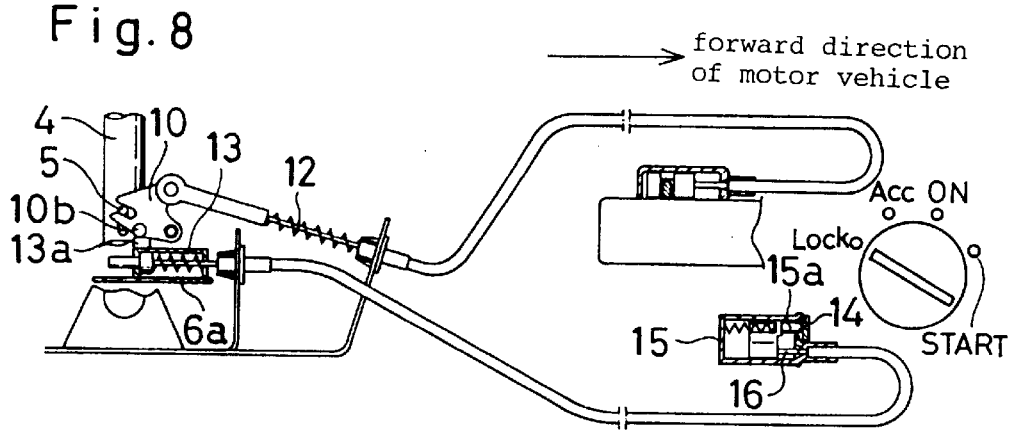
FIG. 8~11 are explanatory views sequentially shown how the gear shift lock device works.

With reference to FIGS. 1 and 8, the two Figures show the gear shift lock device when the parking brake pedal 14 is not applied at the time of stopping the engine.

In this instance, the stem 14a of the parking brake pedal 14 depresses the pin 15a of the step-in detection member 15 so as to slide the lock cover 13 forward by way of the shift lock cable 16. Namely, the shift lock cable 16 sets the lock cover 13 in the block position and placing the select plate 10 in the lock position so as to exhibit the gear shift lock.

Even when applying the parking brake pedal 14, it renders impossible to rotationally move the select plate 10 through the key interlock cable 12 so as to exhibit the gear shift lock.

Because of the lock cover 13 placed between the select plate 10 and the slide plate 6a to lock the select plate 10, it renders unable to depress the button 3 so as to resultantly incapacitate the gear shift lever 1 moving from the P range position when attempting to depress the button 3.

Figure 9:
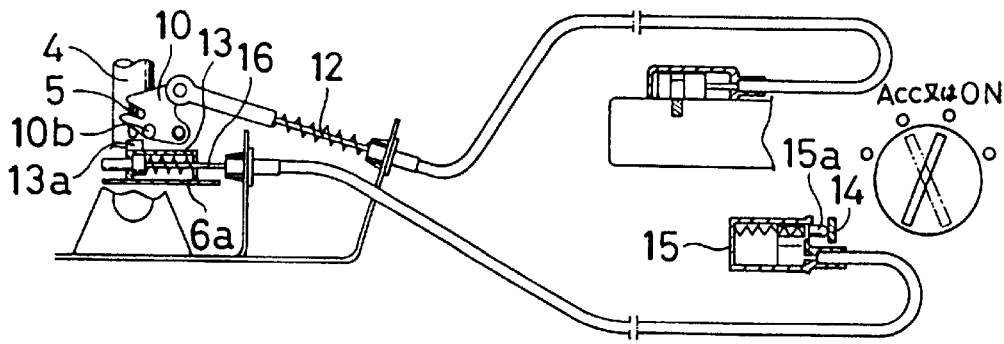

FIG. 9 shows that the key 9 is in an accessory state or on-state with the parking brake petal 14 applied.

When the parking brake petal 14 is applied, the pin 15a of the step-in detection member 15 extends outward to slide the lock cover 13 rearward by way of the shift lock cable 16 so as to place the select plate 10 in the block release position. This renders the select plate 10 movable from the lock position to the unlock position so as to release the gear shift lock.

Because of the select plate 10 rendered movable from the lock position to the unlock position by applying the parking brake pedal 14 with the key 9 positioned in the accessory state or on-state, depressing the button 3 lowers the detent pin 5 to move the select plate 10 from the lock position to the unlock position so as to permit the gear shift action.

Figure 10:
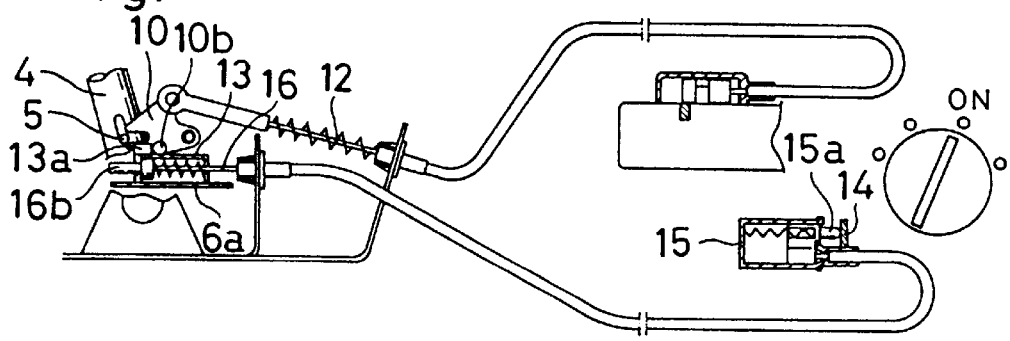

FIGS. 2 and 10 show the gear shift lock device when the parking brake pedal 14 is applied at the time of operating the engine.

Figure 11:
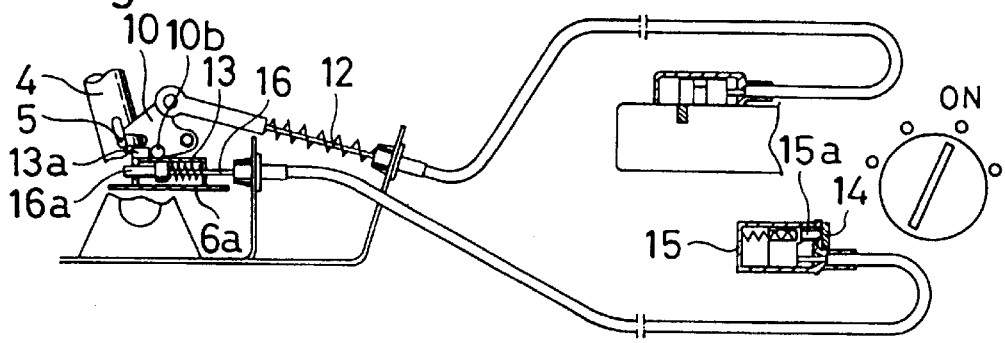
Figure 12:
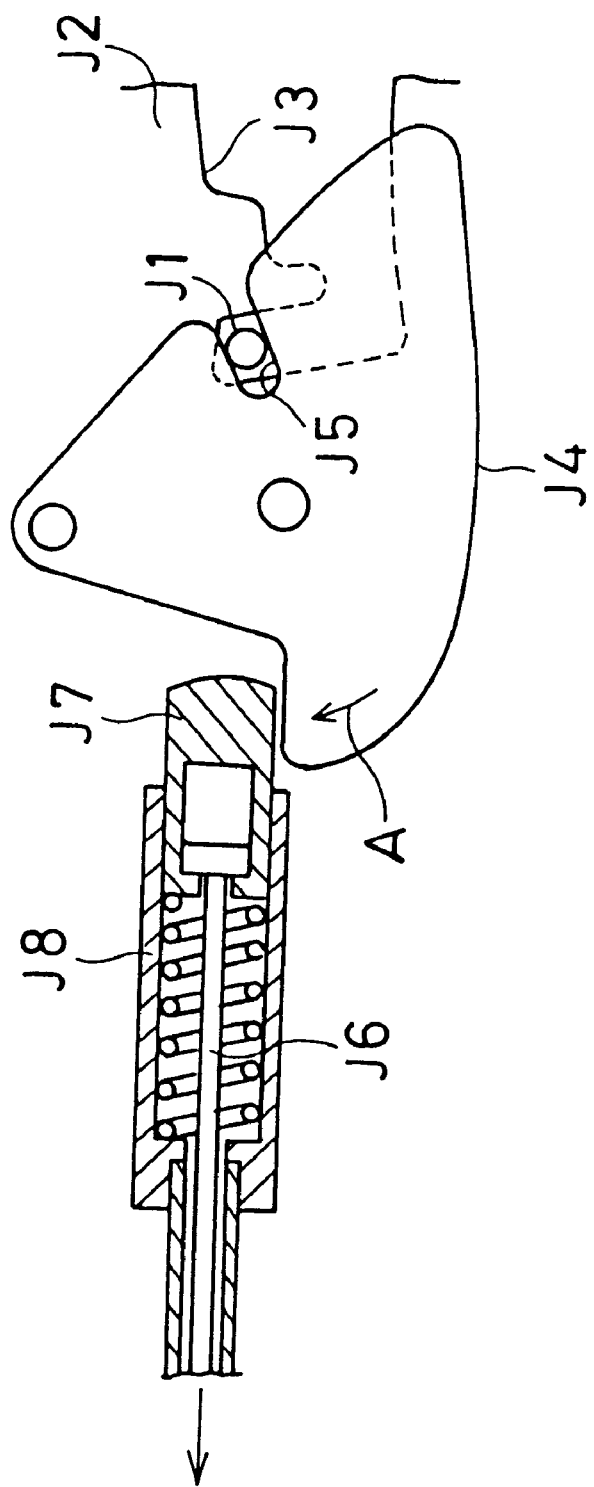
FIG. 12 is a side elevational view of a main part of a prior art gear shift lock device.

FIG. 11 shows the gear shift lock device when the parking brake pedal 14 is not applied at the time of operating the engine.

In the condition in which the key 9 is placed in the drive position to start the engine, and the parking brake pedal 14 is applied to set the gear shift lever 1 in the D range, the upper lug 13a is brought into, engagement with the lateral lug 10b to set the lock cover 13 in the block position and placing the select plate, 10 in the unlock position.

This renders unable to set the key 9 in the locked position unless placing the gear shift lever 1 in the P range. Namely, although it is possible to stop the engine, it is impossible to pull out the key 9 from the key cylinder 11 because of the key 9 rendered unable to be set in the locked position.

As apparent from the foregoing description, when the detent pin 5 is exerted to move downward with that pushing operation of the button 3 while the parking brake pedal 14 is not applied (i.e., the gear shift lock is working), the lock cover 13 is placed between the select plate 10 and the stationary member so as to prevent the rotational movement of the select plate 10.

Namely, even when the rotational force is applied to the select plate 10 while the gear shift lock is working, it is possible to effectively avoid the prying force from occurring against the lock cover 13 which prevents the rotational movement of the select plate 10, thus prolonging the service life without inviting any mulfunctions.

I claim:

1. A gear shift lock device for a vehicular automatic transmission comprising:

a movable near shift lever provided to select a specified one among a plurality of ranges including a parking range for a vehicular automatic transmission;

a detent pin arranged to move downward by depressing a button provided on a knob of the gear shift lever;

a detent plate provided in a movable range of the gear shift lever, and having a detent cam which designates one of the plurality of ranges including the parking range when brought into engagement with the detent pin;

a select plate having an engagement portion, and provided rotationally between a lock position in which the engagement portion lodges the detent pin to lock the gear shift lever in the parking range, and an unlock position in which the engagement portion is dislodged from the detent pin;

a key interlock cable having one end connected to the select plate and the other end connected to a key cylinder to transmit the movement of the key cylinder to the select plate in order to place the select plate in the lock position when a key is in a position to stop an engine, and placing the select plate in the unlock position when the key is in a position to start the engine;

a lock cover provided slidably on a stationary portion between a first position in which the select plate is placed between the stationary portion and the select plate to place the select plate in the lock position so as to prevent the rotational movement of the select plate, and a second position in which the select plate is released to recover its rotational movement;

a step-in detection member provided on a parking brake pedal so as to move with the step motion of the parking brake pedal; and a shift lock cable having one end connected to the lock cover and the other end connected to the step-in detection member so as to transmit the movement of the parking brake pedal to the lock cover in order to set a slidable position of the lock cover in the first position when the parking brake pedal is not applied, and placing the slidable position of the lock cover in the second position when the parking brake pedal is applied;

wherein the lock cover has an upwardly directed lug and the select plate having a laterally directed lug so as to engage the upward lug against the lateral lug to prevent the rotational movement of the select plate when the lock cover is in the first position.

2. A gear shift lock device for a vehicular automatic transmission comprising:

a movable gear shift lever provided to select a specified one among a plurality of ranges including a parking range for a vehicular automatic transmission;

a detent pin arranged to move downward by depressing a button provided on a knob of the gear shift lever;

a detent plate provided in a movable range of the gear shift lever, and having a detent cam which designates one of the plurality of ranges including the parking range when brought into engagement with the detent pin;

a select plate having an engagement portion, and provided rotationally between a lock position in which the engagement portion lodges the detent pin to lock the gear shift lever in the parking range, and an unlock position in which the engagement is dislodged from the detent pin;

a key interlock c able having one end connected to the select plate and the other end connected to a key cylinder to transmit the movement of the key cylinder to the select plate in order to place the select plate in the lock position when a key is in a position to stop an engine, and placing the select plate in the unlock position when the key is in a position to start the engine;

a lock cover provided slidably on a stationary portion between a first position in which the select plate is placed between the stationary portion and the select plate to place the select plate in the lock position so as to prevent the rotational movement of the select plate, and a second position in which the select plate is released to recover its rotational movement;

a step-in detection member provided on a parking brake pedal so as to move with the step motion of the parking brake pedal; and a shift lock cable having one end connected to the lock cover and the other end connected to the step-in detection member so as to transmit the movement of the parking brake pedal to the lock cover in order to set a slidable position of the lock cover in the first position when the parking brake pedal is not applied, and the placing the slidable position of the lock cover in the second position when the parking brake pedal is applied;

wherein the lock cover has an upwardly directed lug and the select plate has a laterally directed lug so as to engage the upward lug against the lateral lug to prevent rotational movement of the select plate when the lock cover is in the first position, and wherein the upward lug engages against the lateral lug to set the slidable position of the lock cover in the second position irrespective of a parking brake pedal position when the select plate is in the unlock position.

3. A gear shift lock device for a vehicular transmission comprising:

a moveable near shift lever provided to select a specified one among a plurality of ranges including a parking range for a vehicular automatic transmission;

a detent pin arranged to move downward by depressing a button provided on a knob of the gear shift lever;

a detent plate provided in a moveable range of the gear shift lever, and having a detent cam which designates one of the plurality of ranges including the parking range when brought into engagement with the detent pin;

a select plate having an engagement portion, and provided rotationally between a lock position in which the engagement portion lodges the detent pin to lock the gear shift lever in the parking range, and an unlock position in which the engagement portion is dislodged from the detent pin;

a key interlock cable having one end connected to the select plate and the other end connected to a key cylinder to transmit the movement of the key cylinder to the select plate in order to place the select plate in the lock position when a key is in a position to stop an engine, and placing the select plate in the unlock position when the key is in a position to start the engine;

a lock cover provided slidably on a stationary portion between a first position in which the select plate is placed between the stationary portion and the select plate to place the select plate in the lock position so as to prevent the rotational movement of the select plate, and a second position in which the select plate is released to recover its rotational movement;

a step-in detection member provided on a parking brake pedal so as to move with the step motion of the parking brake pedal; and a shift lock cable having one end connected to the lock cover and the other end connected to the step-in detection member so as to transmit the movement of the parking brake pedal to the lock cover in order to set a slidable position of the lock cover in the first position when the parking brake is not applied, and placing the slidable position of the lock cover in the second position when the parking brake pedal is applied;

wherein the lock cover having an upwardly directed lug and the select plate having a laterally directed lug so as to engage the upward lug against the lateral lug to prevent the rotational movement of the select plate when the lock cover is in the first position, and wherein a length of an upper surface of the upward lug is greater than a stroke of the shift lock cable but smaller than lateral movement of the lateral lug.

4. A gear shift lock device for a vehicular automatic transmission comprising:

a moveable gear shift lever provided to select a specified one among a plurality of ranges including a parking range for a vehicular automatic transmission;

a detent pin arranged to move downward by depressing a button provided on a knob of the gear shift lever;

a detent plate provided in a moveable range of the gear shift lever, and having a detent cam which designates one of the plurality of ranges including the parking range when brought into engagement with the detent pin;

a select plate having an engagement portion, and provided rotationally between a lock position in which the engagement portion lodges the detent pin to lock the gear shift lever in the parking range, and an unlock position in which the engagement portion is dislodged from the detent pin;

a key interlock cable having one end connected to the select plate and the other end connected to a key cylinder to transmit the movement of the key cylinder to the select plate in order to place the select plate in the lock position when a key is in a position to stop an engine, and placing the select plate in the unlock position when the key is in a position to start the engine;

a lock cover provided slidably on a stationary portion between a first position in which the select plate is placed between the stationary portion and the select plate to place the select plate in the lock position so as to prevent the rotational movement of the select plate, and a second position in which the select plate is released to recover its rotational movement;

a step-in detection member provided on a parking brake so as to move with the step motion of the parking brake pedal; and a shift lock cable having one end connected to the lock cover and the other end connected to the step-in detection member so as to transmit the movement of the parking brake pedal to the lock cover in order to set a slidable position of the lock cover in the first position when the parking brake pedal is not applied, and placing the slidable position of the lock cover in the second position when the parking brake pedal is applied;

wherein said lock cover has an upwardly directed lug and said select plate has a laterally directed lug, wherein, when said select plate is placed in the locked position, said upwardly directed lug engages said laterally directed lug to prevent a rotational movement of said select plate when said lock cover is in said first position, and wherein, when said select plate is placed in the unlocked position, said lock cover is in said second position and said laterally directed lug engages said upwardly directed lug to retain said lock cover in said second position irrespective of a position of said parking brake.

5. A gear shift lock device for a vehicular automatic transmission as claimed in claim 4, wherein a length of an upper surface of said upwardly directed lug is greater than a stroke length of said shift lock cable, and wherein said length of said upper surface of said upwardly directed lug is smaller than a lateral movement of said laterally directed lug.

* * * * *